June 1, 1937.  W. J. ADAMS, JR  2,082,091

CONTROL KNOB

Filed May 24, 1935

INVENTOR
W. J. ADAMS, JR.
BY J. MacDonald
ATTORNEY

Patented June 1, 1937

2,082,091

UNITED STATES PATENT OFFICE 2,082,091

CONTROL KNOB

William J. Adams, Jr., Hartsdale, N. Y., assignor to Bell Telephone Laboratories, Incorporated, New York, N. Y., a corporation of New York Application May 24, 1935, Serial No. 23,260

7 Claims. (Cl. 74—553)

This invention relates to control knobs and more particularly to rotatable control knobs for electrical apparatus.

The object of this invention is to provide a control knob equipped with an indicating pointer.

A feature of this invention resides in the indicating pointer on the control knob.

Other features residing in the structure and arrangement of the parts will be subsequently pointed out in the specification.

Figure 1:
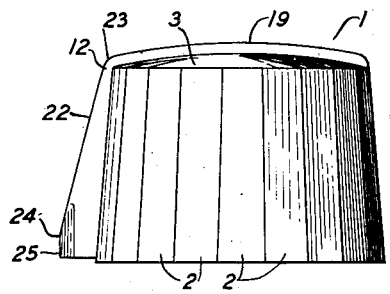
Fig. 1 is a side elevational view of the preferred form of the control knob.
Figure 4:
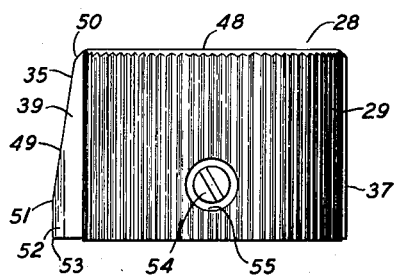
Fig. 4 is a side elevational view of another form of the control knob.
Figure 2:
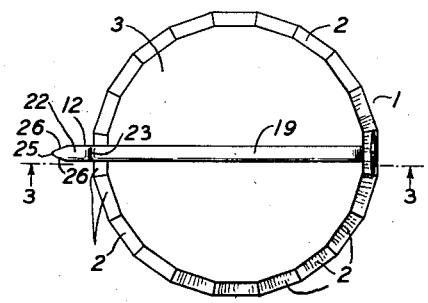
Fig. 2 is a top plan view of the control knob shown in Fig. 1.
Figure 5:
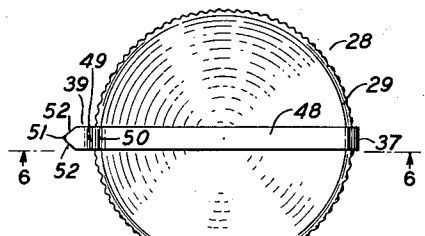
Fig. 5 is a top plan view of the control knob shown in Fig. 4.
Figure 3:
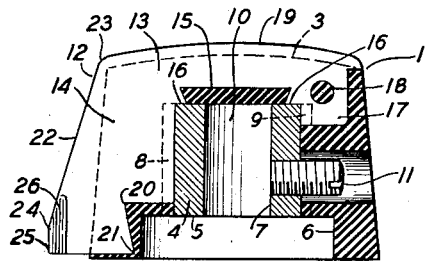
Fig. 3 is a side elevational view, partly in section, of the control knob shown in Figs. 1 and 2, taken on the line 3—3 in Fig. 2 and viewed in the direction indicated by the arrows.
Figure 6:
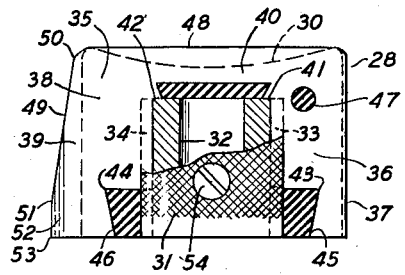
Figure 7:
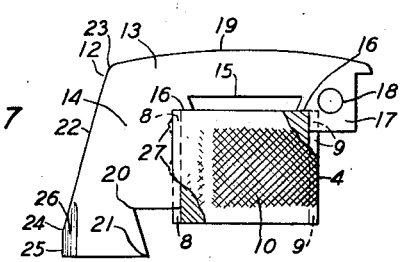

Fig. 6 is a side elevational view, partly in section, of the control knob shown in Figs. 4 and 5, taken on the line 6—6 of Fig. 5 and viewed in the direction indicated by the arrows; and Fig. 7 is a side elevational view of the pointer shown in Figs. 1, 2 and 3 and attached to a cylindrical insert for the control knob, the cylindrical insert being shown partly in section.

In the mounting of electrical control elements, such as for instance as variable condensers and potentiometers, on control panels, the spacing of the elements is frequently determined by the space required for the manually operated control knobs for the elements. To determine the degree of rotation of a manually operated control knob, it is found advisable in some cases to have a pointer on the knob, the knob being manually rotated so that the pointer travels relative to a calibrated scale on the outer face of the control panel. If the pointer extends only across the top of the control knob, it is sometimes difficult to accurately determine the degree of rotation of the control knob. If the pointer extends radially of the control knob, the degree of rotation may be more readily determined than if the pointer did not project from the control knob but more space is required on the control panel than is required where there is no projecting pointer.

This invention provides a pointer equipped control knob which takes up a minimum amount of space on a control panel and thereby permits comparative close spacing of apparatus parts on a control panel.

Referring to Figs. 1, 2, 3 and 7 of the drawing, 1 is a molded body member made of insulating material. The body member 1 is made in the form of a frustrum of a pyramid and has a suitable number of flat faces 2 on the outer surface of its side wall to provide finger grip surfaces to facilitate manual rotation of the control knob. The top portion 3 of the body member 1 is convex. A metal insert 4 as shown in Fig. 3 is embedded in the body member 1 so that the lower end 5 of the metal insert 4 comes flush with the base of a circular depression 6 provided in the base of the body member 1. The metal insert 4 is longitudinally drilled at 7 to accommodate a shaft, not shown, of an electrical control member. The metal insert 4 is preferably in the form of a cylinder and has two spaced grooves 8 and 9 formed in its outer cylindrical wall, the grooves being diametrically disposed relative to each other and running parallel to the longitudinal axis of the metal insert 4. The outer wall surface of the metal insert 4 is knurled at 10 as shown in Fig. 7 to provide a gripping surface for the insulating material of the molded body member 1. The metal insert 4 is drilled and tapped on its side to accommodate a set screw 11 which may be turned into the metal insert 4 to bear against a portion of a shaft, not shown, of an electrical control element.

Extending diametrically across the top of the body member 1 and downwardly along one of the flat faces 2 is a pointer 12. The pointer 12 is substantially L-shaped and may be cast or formed out of sheet metal or other material suitable for the purpose. The pointer 12 has a horizontally disposed body portion 13 and a downwardly directed leg portion 14. The horizontally disposed body portion 13 has a lower flat straight portion 15. On each end of the lower flat straight portion 15 of the body portion 13 is a downwardly and inwardly directed shoulder 16 adapted to rest on the top of the metal insert 4. Extending downward from the right end of the body portion 13 and below one of the shoulders 16 is a rectangular portion 17, apertured at 18 to permit material of the body member 1 to pass through during the molding of the body member 1. The space between the inside edge of the downwardly directed leg portion 14 and the inside edge of the rectangular portion 17 of the pointer 12 coincides with the space between the base walls of the grooves 8 and 9. When the pointer 12 is placed across the top of the metal insert 4, in register with the grooves 8 and 9, the inside edge of the downwardly directed leg portion 14 slides into the groove 8 and the inside edge of the rectangular portion 17 slides into the groove 9. The top 19 of the body portion 13 is upwardly curved to follow the contour of the convex top 3 of the body member 1 and extends diametrically across and above the top 3 of the body member 1 in the form of a fin. The top 19 of the body portion 13 also extends beyond and to the right of the outer extremity of the rectangular portion 17, as shown in Figs. 3 and 7, to continue the top 19 of the pointer 12 to the top edge of the body member 1.

The downwardly directed leg portion 14 of the pointer 12, having its inner edge resting in the groove 8, extends downward along the outside of the metal insert 4 and beyond the lower end of the metal insert 4 almost to the lower extremity of the body member 1 as shown in Fig. 3. The inner side of the lower end of the leg portion 14 is cut out in the form of an acute angle at 20 to accommodate insulating material of the body member 1 on one side of where the circular depression 6 is formed and to provide an anchoring point 21 for the lower end of the leg portion 14 in the material of the body member 1. The left side 22 of the downwardly directed leg portion 14 of the pointer 12 extends outward from one side of the body member 1 and is progressively diverged from the outer surface of one of the flat faces 2 on the outside of the body member 1 from a point 23 on the top to a point 24 near the base of the body member 1 where the left side 22 of the downwardly extending leg portion 14 is continued in a direction parallel to the axis of the control knob and to a point just slightly above the lower extremity of the body member 1 to form a point portion 25. The point portion 25 is beveled on opposite sides as shown at 26—26 in Fig. 2 to create a knife-edged point on the lower left end of the downwardly extending leg portion 14, the knife-edged point being utilized as an indicator to determine extent of rotation of the control knob. The top edges of the body portion 13 of the pointer 12 and the outer edges of the leg portion 14 are slightly rounded off and no sharp corners are left on the exposed portions of the pointer 12 except at the outermost extremity of the downwardly extending leg portion 14. The pointer 12 may be staked to the metal insert 4 as shown in Fig. 7 at separated points 27 by swaging outer edge portions of the groove 8 against and slightly into the sides of the leg portion 14 of the pointer 12.

In producing the control knob above described, it is preferable to have a color contrast between the molded body member 1 and the pointer 12 so that the pointer 12 may be readily distinguished from the body member 1. For instance, if the body member 1 is made of some dark colored or black insulating material and the pointer 12 is made of chromium and is highly polished, the pointer 12 is immediately observed by any one whose attention is directed to the control knob. With the top edges of the body portion 13 and the outer edges of the downwardly directed leg portion 14 rounded off and leading into the beveled knife-edged point portion at 25, the eye of the observer is quickly drawn to the point 25. The structure, therefore, produces an optical effect which leads the eye of an observer to the point 25 and this point is immediately recognized as the point to be observed when the control knob is rotated. The portion of the pointer 12 which projects radially of the molded body member 1, therefore, need only be of comparatively short length and may be, for instance, of about the same length relative to the diameter of the molded body member as shown in the figures of the drawing. The extreme point of radial projection of the lowermost portion of the downwardly extending leg portion 14 of the pointer 12 from the periphery of the molded body member 1 may be about one-seventh or even one-tenth of the diameter of the molded body member 1 and still be readily distinguishable as the point to be observed in determining the extent to which the control knob has been rotated relative to a calibrated scale on the outer face of a control panel.

In Figs. 4, 5 and 6 a control knob is shown, the structure of which is somewhat different to that of the control knob shown in Figs. 1, 2 and 3. In this embodiment, a cylindrical body member 28 of insulating material is provided. The peripheral side wall of the body member 28 is knurled as shown at 29 in Figs. 4 and 5 and the top of the body member 28 is concave as shown at 30 in Fig. 6. A cylindrical metal insert 31 longitudinally bored at 32 is molded into the body member 28. The metal insert 31 has two oppositely disposed grooves 33 and 34 formed in its outer surface and running parallel to the longitudinal axis.

A pointer 35 is held in the body member 28. The pointer 35 is a flat U-shaped piece formed from sheet metal or other suitable material. One leg portion 36 extends downward through the cylindrical body member 28 and radially of the metal insert 31 and has an outer edge portion 37 extending in the form of a fin slightly beyond the periphery of the knurled side wall of the body member 28. The other leg portion 38 extends downward through the cylindrical body member 28 and radially of the metal insert 31 and is disposed diametrically opposite to the leg portion 36. The leg portion 38 has an outer portion 39 extending beyond the outer wall of the body member 28. The closed end 40 of the U-shaped pointer 35 extends diametrically across the concave top 30 of the body member 28. The lower edge of the closed end portion 40 of the U-shaped pointer 35 terminates in spaced and downwardly projecting portions 41, 42 which rest on the top of the metal insert 31. The inner edges of the leg portions 36 and 38 slide into the respective grooves 33 and 34. The pointer 35 may be staked to the metal insert 31 by swaging outer edge portions of the walls of the grooves 33 and 34 against and slightly into the sides of the respective leg portions 36 and 38 of the U-shaped pointer 35. The lower ends of the leg portions 36 and 38 of the U-shaped pointer 35 have portions cut out from their inner edges at 43 and 44, respectively, and the cuts are made at an acute angle to provide anchorage points 45 and 46 for the lower extremities of the U-shaped pointer 35 in the body member 28. The leg portion 36 is apertured at 47 to permit some of the material of the body member 28 to pass through in a molding operation and thereby serves to further hold the U-shaped pointer 35 in the body member 28. A top edge 48 of the closed end of the U-shaped pointer 35 extends above and diametrically across the concave top of the body member 28 in the form of a fin. The leg portion 38 of the U-shaped pointer 35 extends downward through the body member 28 and has an outer edge portion 49 which gradually diverges from the body member 28 from an upper point 50 to a lower point 51, and then runs parallel to the longitudinal axis of the body member 28, thus forming a fin-like portion extending beyond the periphery of the knurled outer wall of the body member 28. The fin-like portion thus formed is beveled on opposite sides at 52—52 to form a knife-edge point 53 at the outer lower extremity of the leg portion 38. The knife-edge point 53 serves as a point to be observed in determining the extent of rotation given the turning knob relative to a fixed calibrated scale on the outer surface of a control panel.

A set screw 54 threaded into a drilled and tapped aperture in the side of the metal insert 31 and accessible from the exterior of the knob by way of a suitable transverse aperture 55 is provided to secure the knob to the shaft of a control element, not shown, when the shaft of the control element is inserted in the bore 32 of the metal insert 31.

While the control knob illustrated has been described as comprising a molded body member of insulating material and a metal pointer embedded in the body member, other materials adapted to be combined in a structure of the type described could be used without departing from the spirit of the invention.

What is claimed is:

1. An instrument control device comprising a knob of insulating material, a grooved tube and a flat pointer set up edgewise across an end of said tube and secured to said tube in the grooved portion, said tube being wholly embedded in said knob and said flat pointer being partially embedded in said knob and having a portion extending diametrically across the top of said knob and above the top of said knob, and a portion extending down along the side of said knob and projecting radially from the side of said knob.

2. An instrument control device comprising a knob of insulating material, a longitudinally grooved tube and an apertured flat pointer having a body portion extending diametrically across one end of said tube, and a leg portion extending downwardly along said tube and engaged in a groove in said tube, said tube and said pointer being secured together and embedded in said knob of insulating material so that part of the body portion of said pointer extends above the top of said knob and part of the leg portion extend outwardly from the side of said knob.

3. An instrument control device comprising a knob of insulating material, a longitudinally grooved tubular insert for said knob and an apertured flat pointer, said apertured flat pointer having a body portion and downwardly extending leg portions, said body portion extending diametrically across one end of said tubular insert and said leg portions extending downwardly in the grooved portions of said tubular insert and secured therein, said tubular insert being wholly embedded in said knob and said flat pointer having portions embedded in said knob, a portion extending above said knob, and a portion extending radially from the side of said knob, the apertured portion of said pointer being embedded in said knob.

4. An instrument control device comprising a knob of insulating material, a tube having a longitudinally grooved and a scored outer cylindrical surface, a flat pointer having a body portion set up edgewise across the longitudinal axis of said tube, and a pointer portion extending downwardly of the body portion and engaging a side of said tube, said flat pointer setting into the longitudinal groove in said tube and being secured to said tube and said pointer and said tube being embedded in said knob of insulating material so that said pointer has a portion of its body portion extending across and above the top of said knob and a pointer portion extending downwardly of and radially from a side of said knob.

5. An instrument control device comprising a knob of insulating material, a tube and an apertured L-shaped member assembled together and embedded in said knob, said tube being wholly embedded in said knob and said L-shaped member being partially embedded in said knob and having portions extending above said knob and radially from the knob.

6. An instrument control device comprising a knob of insulating material, a tube having a knurled outer surface and spaced longitudinal grooves in its outer surface, and an apertured flat L-shaped pointer set up edgewise relative to said tube, said flat pointer having a body portion extending diametrically across one end of said tube, a leg portion, and an extension on the body portion setting into the spaced longitudinal grooves in said tube and secured therein by staking the parts together, and a knife edge formed on the leg portion of said pointer, said tube being wholly embedded within said knob and said pointer being partly embedded in said knob and having part of its body portion extending above the top of said knob and part of the leg portion extending radially from a side of said knob.

7. An instrument control device comprising a knob of insulating material, a tube having a knurled outer surface and spaced longitudinal grooves in its outer surface, and an apertured U-shaped flat pointer set up edgewise relative to said tube, said flat pointer having a body portion extending diametrically across one end of said tube, leg portions setting into the longitudinal grooves in said tube and secured therein, and a knife edge formed on one of the leg portions of said pointer, said tube being wholly embedded within said knob and said pointer being partly embedded in said knob and having part of its body portion extending above the top of said knob and part of the leg portion on which the knife edge is formed extending radially from a side of said knob.

WILLIAM J. ADAMS, Jr.